Feb. 2, 1937.  E. W. MILLER  2,069,324
GEAR LAPPING MACHINE
Filed Feb. 26, 1934  7 Sheets-Sheet 1
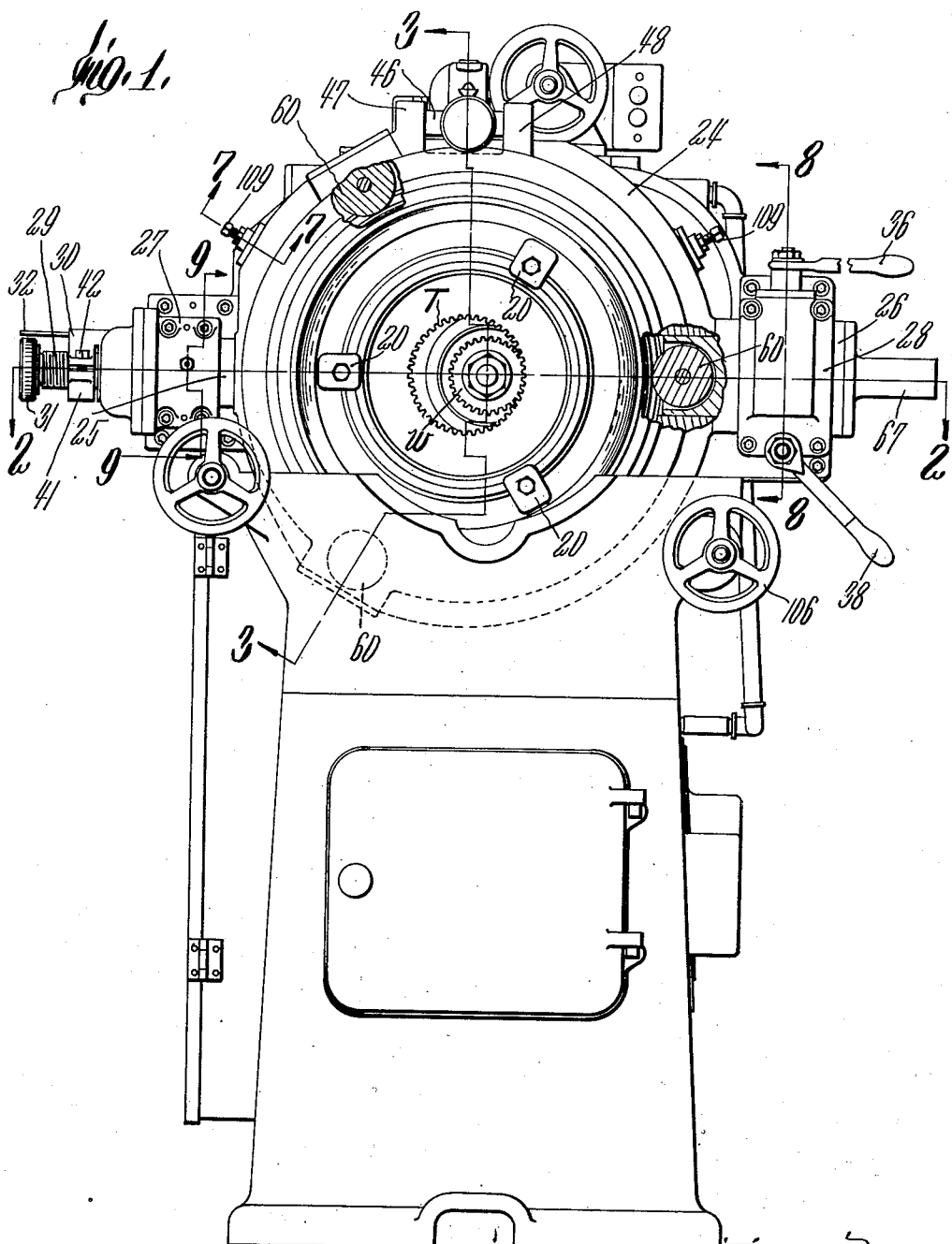

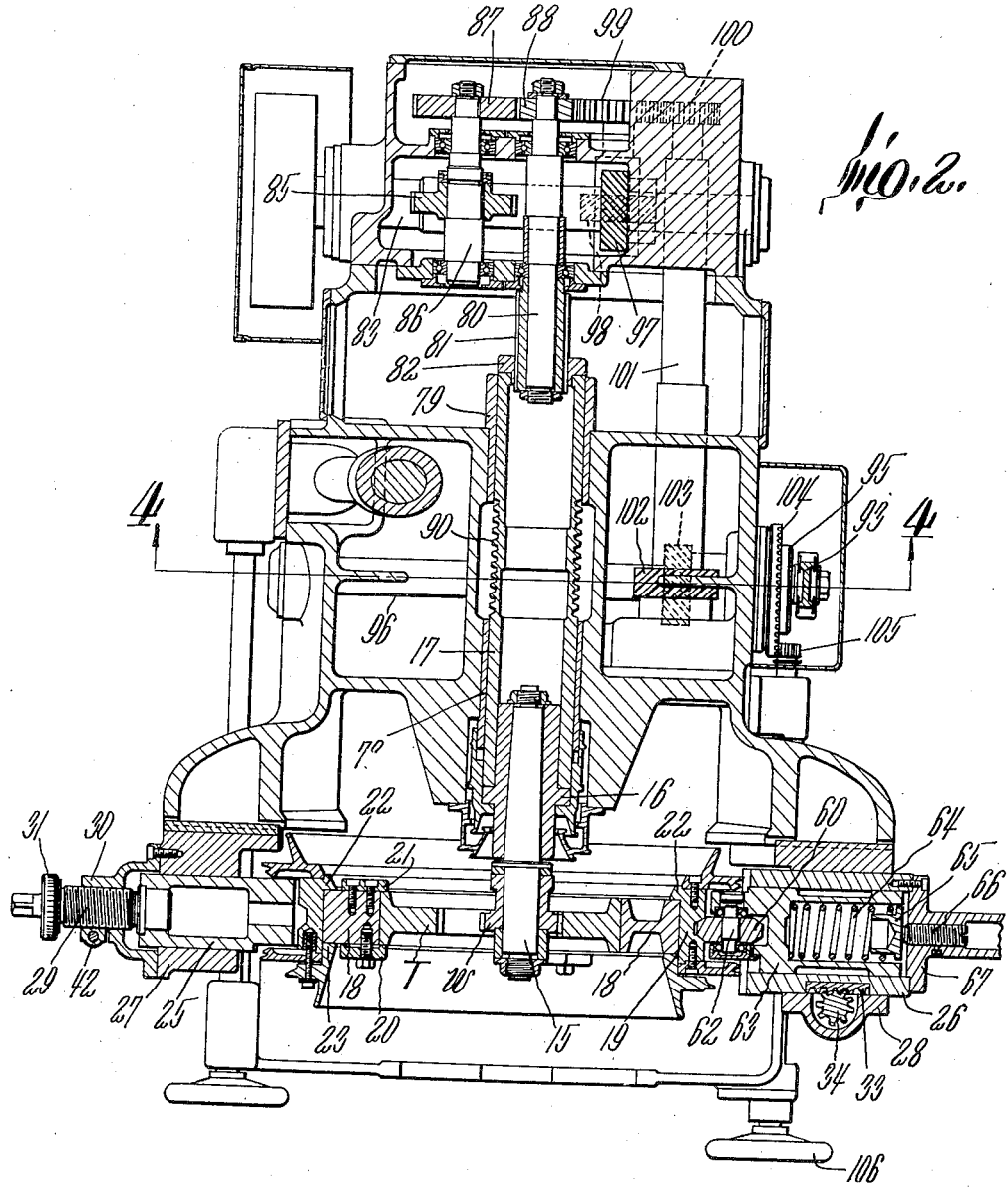

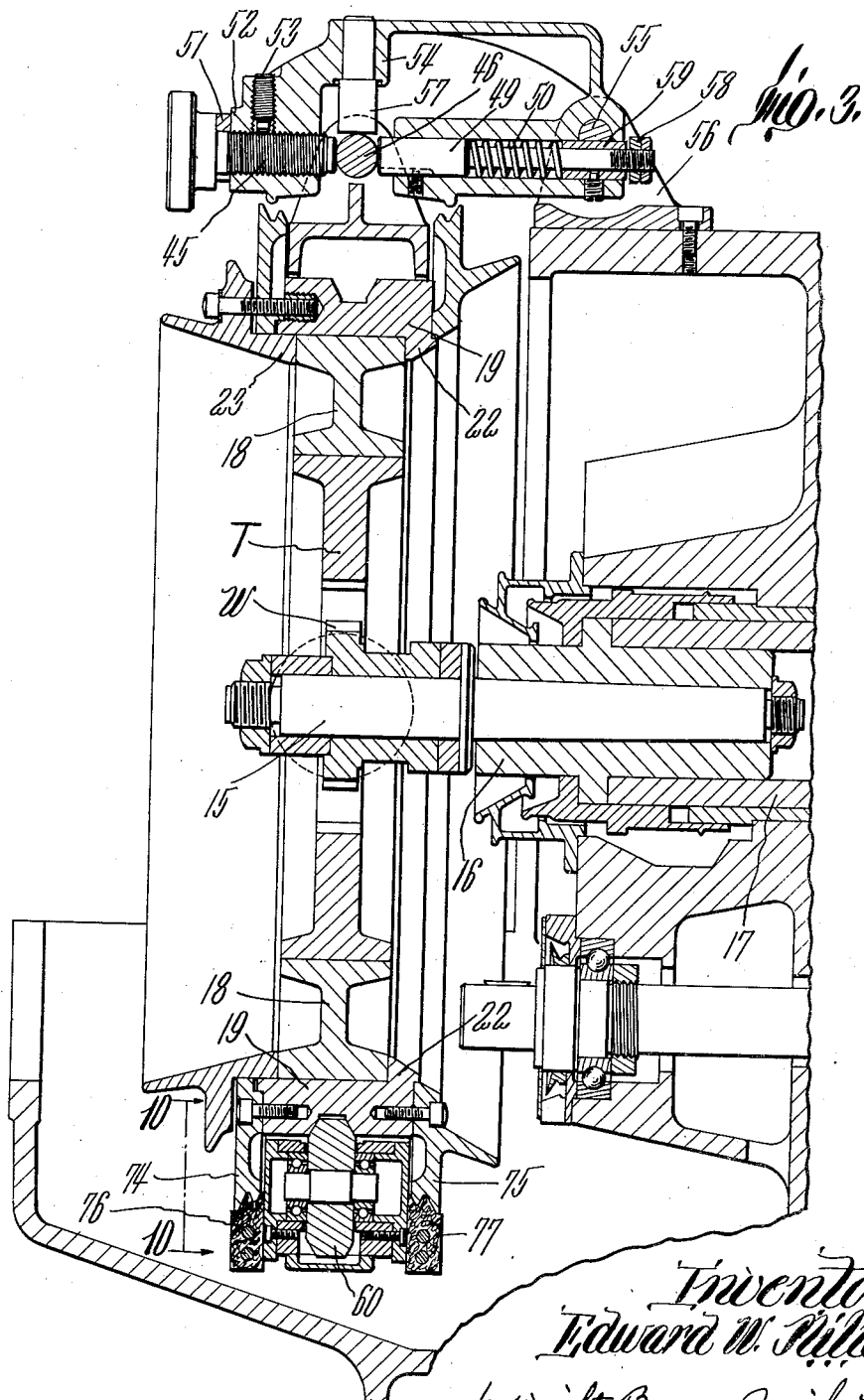

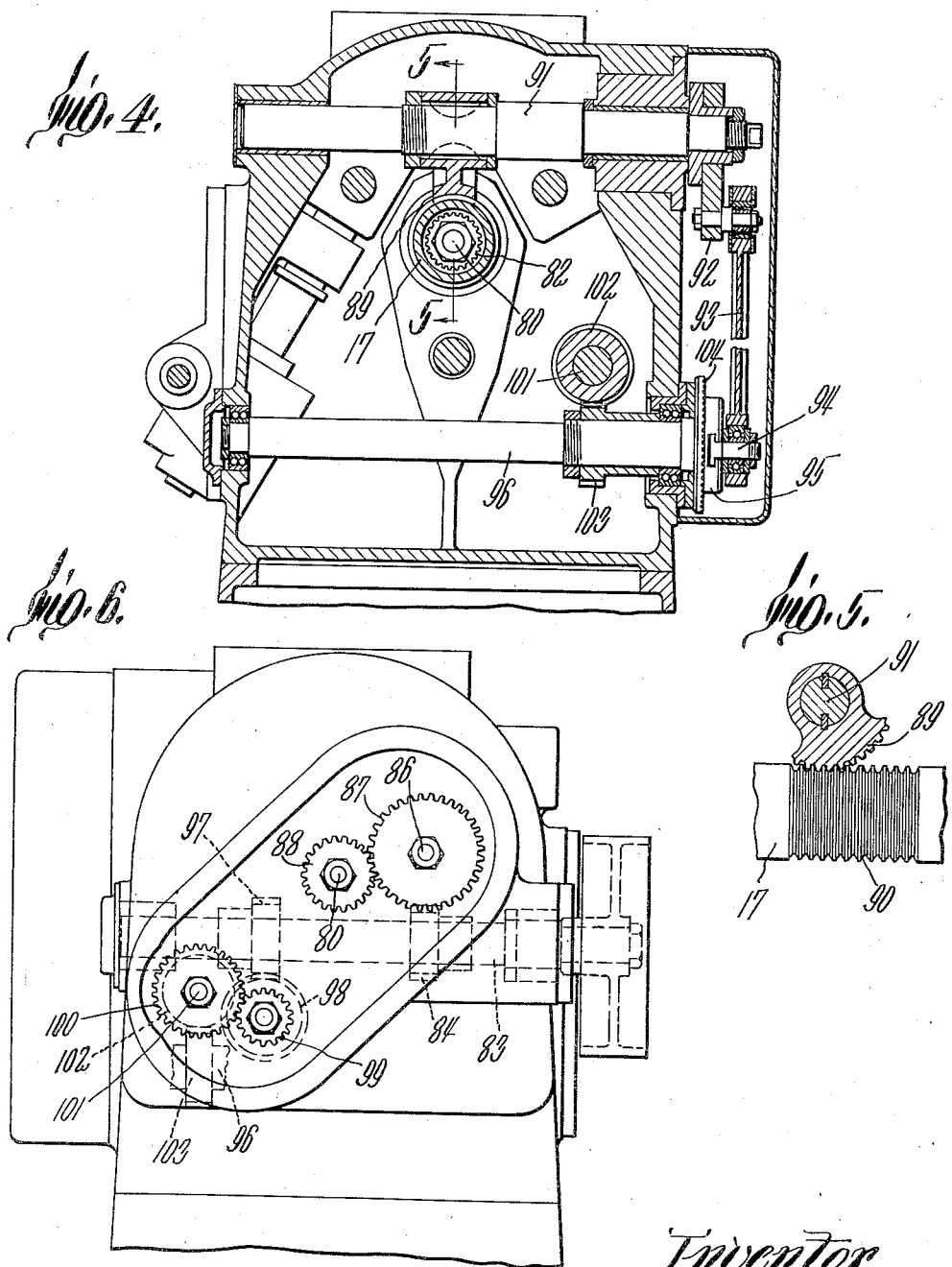

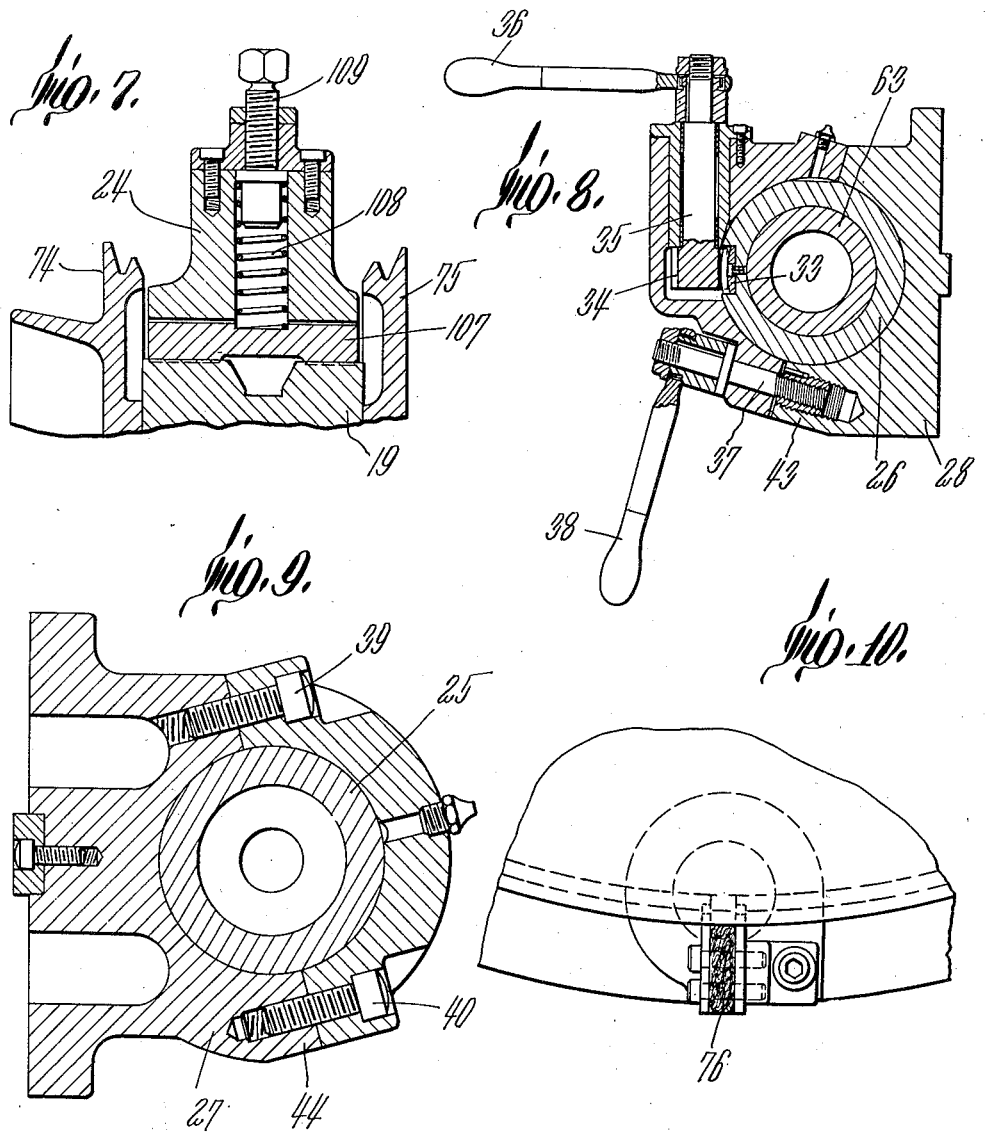

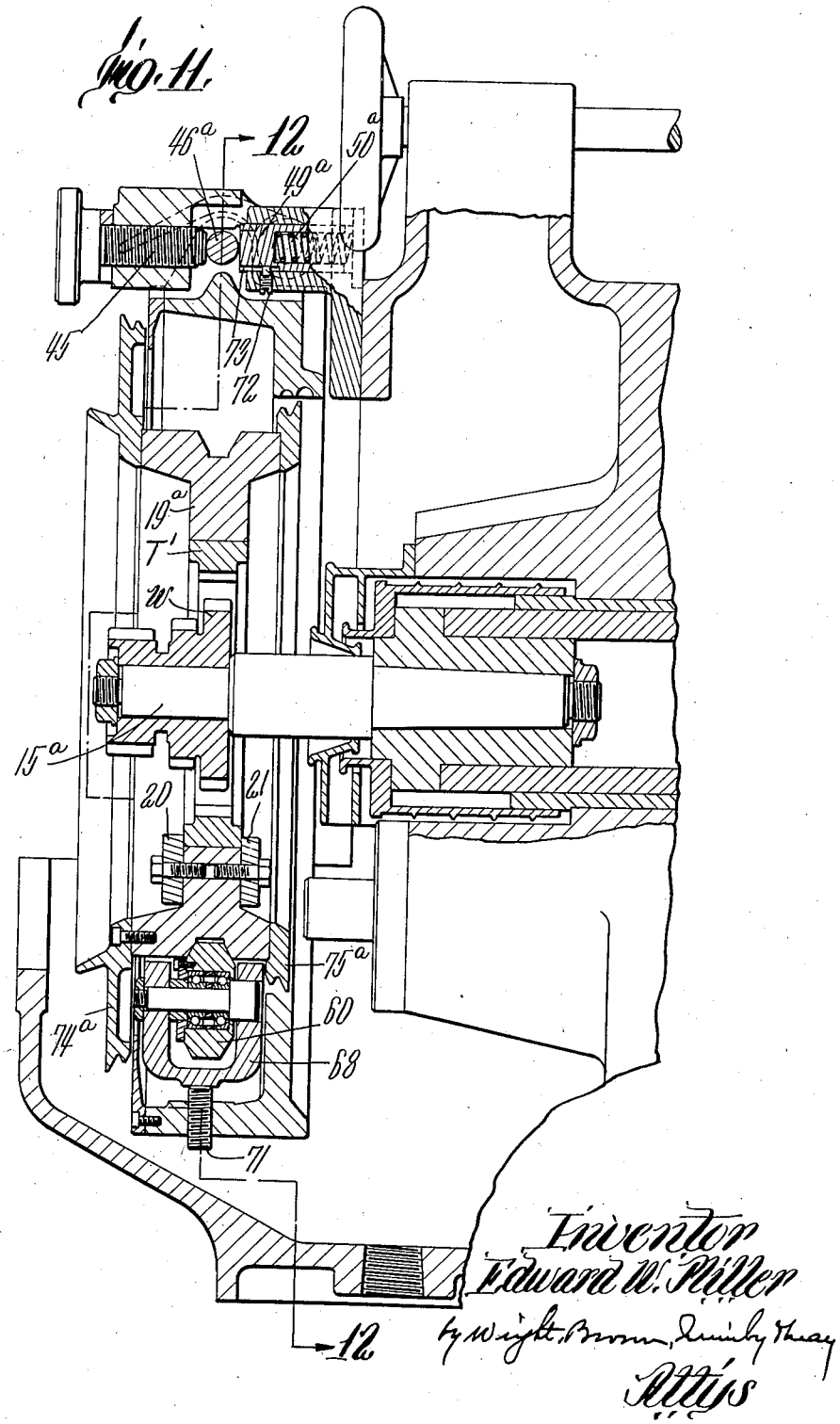

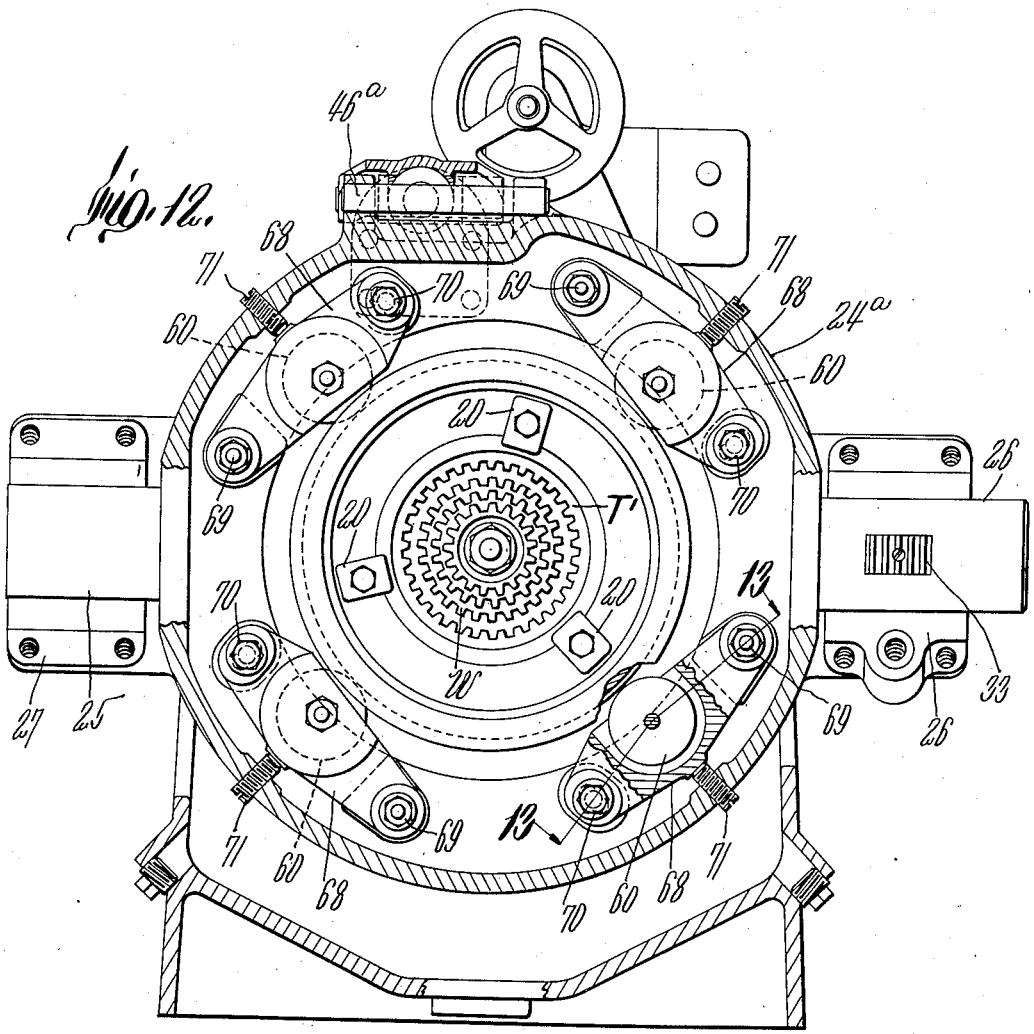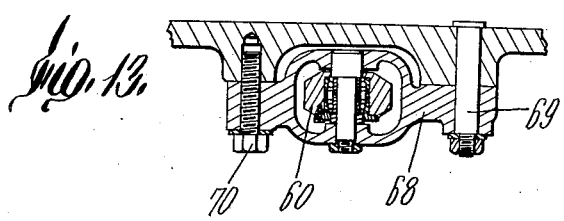

Patented Feb. 2, 1937

2,069,324

UNITED STATES PATENT OFFICE 2,069,324

GEAR LAPPING MACHINE

Edward W. Miller, Springfield, Vt., assignor to The Fellows Gear Shaper Company, Springfield, Vt., a corporation of Vermont Application February 26, 1934, Serial No. 712,936

21 Claims. (Cl. 51—26)

The present invention relates to the finishing of gears by running them in mesh with a tool in the nature of a conjugate gear and against such resistance as to cause substantial pressure to be exerted between the mating teeth of the work gear and the tool gear, whereby irregularities and inaccuracies are removed from the tooth faces of the work gear. This machine is entitled as a gear lapping machine because its intended mode of use is to perform the fine character of abrasive action known as lapping, which is obtained by introducing finely divided particles of abrasive matter, mixed with a fluid or semi-fluid vehicle, between the surfaces to be finished of the work piece and the smooth contact surfaces of a hard metal tool, but essentially the same machine may be used for burnishing by non use of the lapping material or composition, or for grinding by the substitution of a tool which is itself an abrader in place of the smooth faced lapping or burnishing tool. Consequently the invention is not to be considered as limited by its title to the use of lapping as distinguished from other uses to which the tool and the operating mechanisms herein disclosed, or equivalent parts operating according to the same cooperative laws, may be applied. Having thus made clear that the term "lapping" is not to be construed as limiting the present invention to less than the full scope of its novelty in relation to the prior art, I will from now on generally refer to the operation of the machine as that of lapping, and to the tool used for performing the operation as a lapping tool, for convenience and brevity.

The lapping of spur gears has never heretofore been accomplished with complete satisfaction owing to the difference in radial slip between contacting teeth of the work and tool at points more or less distant from the pitch line. There is no such slip whatever at the pitch line, while there is progressively increasing slip at points on the tooth face, progressively more remote from the pitch line both toward and away from the center. Even though an axial reciprocation be effected between the work and tool simultaneously with their rotational movement, nevertheless the abrasive effect is still always greater away from the pitch line than at the pitch line, which tends to bring the bearing of the lapped gear teeth on the teeth of mating gears largely or wholly to the pitch line, thus losing the effect of quiet running which results from mating teeth coming gradually into bearing with one another before reaching the pitch point.

It is the object of this invention to avoid the difficulties above referred to and obtain a more perfect result in the lapping of gears by applying the abrasive or rubbing effect in such manner that the difference of radial slip between points on the pitch line of the work, and points either outside or inside of the pitch line, is reduced to the minimum; and to do this by the use of a single tool which is self indexing in the sense that its individual teeth are automatically brought into action successively upon different teeth of the work. This object is accomplished by the provision of a tool in the form of an internal gear conjugate to the gear to be finished, and by suitable mechanism for maintaining it in mesh with the work and imparting rotational and relative axial reciprocation between the work and tool. The invention consists in such a tool, in the operating means for effecting the desired relative motions, and in the combinations and details, and equivalents thereof, of the machine herein disclosed for illustration.

Referring to the drawings furnished for illustration of this specification,—

Fig. 1 is a front elevation of a lapping machine having an internal gear as the tool and embodying other characteristics of the invention;

Fig. 2 is a horizontal section taken on line 2—2 of Fig. 1;

Fig. 3 is a vertical section on line 3—3 of Fig. 1;

Fig. 4 is a vertical cross section taken on line 4—4 of Fig. 2;

Fig. 5 is a detail section taken on line 5—5 of Fig. 4;

Fig. 6 is a partial rear elevation;

Figs. 7, 8 and 9 are detail sectional views taken on lines 7—7, 8—8 and 9—9 respectively of Fig. 1;

Fig. 10 is a fragmentary front elevation of the tool carrier, being the part directly in the rear of the line 10—10 of Fig. 3;

Fig. 11 is a view similar to Fig. 3 showing a variation in the tool supporting means;

Fig. 12 is a vertical section taken on line 12—12 of Fig. 11;

Fig. 13 is a sectional view taken on line 13—13 of Fig. 12 showing one of the tool supporting rolls and its holder.

Like reference characters designate the same parts wherever they occur in all the figures.

The gear to be finished, which will be generally referred to herein as the work piece, is designated W in Figs. 1, 2 and 3, and the tool is designated T in the same figures. The former is represented as a spur gear, that is, one having external teeth which extend parallel to the axis, and the tool is an internal gear conjugate to it in respect to the form and pitch of its teeth. The work is made fast by suitable means, sufficiently shown in the drawings and not necessary to be described in detail, to an arbor 15, which is secured by means of an adapter 16 to a rotatable and axially reciprocatable work spindle 17, so as to be moved by and with said spindle. Mechanisms for rotating and reciprocating this spindle are later described.

The tool T is interchangeable with other tools of different pitch diameters, different tooth spacings, and different tooth forms; and is detachably fitted in an annular adapter 18, which in turn is detachably fitted in a rotatable carrier 19. The tool is held in the adapter by three (more or less) inner and outer clamps 20 and 21 (Fig. 2), and the adapter is held in the carrier 19 between a flange 22 at the rear side of the carrier and a clamp ring 23 secured detachably to its front side. By the use of adapters having appropriate, different, internal diameters, tools of all dimensions within the limits of the carrier may be applied for finishing different gears; or the tools may be designed for direct attachment to the carrier without an intermediate adapter.

The carrier 19 is supported in a holder 24 (Fig. 1) which is normally held stationary on the machine base, but is capable of adjustment bodily in a direction transverse to the parallel axes of the work spindle and tool, so as to bring the tool into mesh with the work, and angularly about an axis perpendicular to the before named axes, for correcting distortions due to heat treatment of the work piece by bringing the tool to bear with more pressure at one end (either end) of the work piece teeth than at the other.

To permit of these adjustments, the holder 24 is equipped with trunnions 25 and 26 in alinement with a diameter of the circular interior space within which the carrier 19 is contained. These trunnions are slidable in alined bearings 27 and 28 respectively, the axis of which intersects the axis of the work spindle 17.

It will be understood that a close and accurate adjustment of the holder in the line of these bearings is necessary, and that the holder must be firmly secured in position, in order to carry out the effect of the machine with the desired accuracy and precision. An abutment 29 for the trunnion 25 is screw threaded into a sleeve 30 which is secured to the end of bearing 27 in axial alinement therewith. The head 31 of this screw is graduated for reading in connection with an index 32 which projects from the end of sleeve 30. The abutment is thus a micrometer which enables the tool holder to be readily and accurately set with the center of the tool at any predetermined distance from the axis of the work spindle. For shifting the tool holder, rack teeth 33 are provided in the side of trunnion 26 with which meshes a pinion 34 on a shaft 35 (Fig. 8) having a bearing in the cap member of trunnion bearing 26 and on the outer end of which is secured a handle 36. The cap member of bearing 26 is readily loosened enough to permit sliding of the trunnion, and tightened to secure it after the holder has been adjusted, by a bolt 37 having an operating handle 38. The box and cap members of bearing 27 are permanently connected together with a close sliding fit on trunnion 25 by bolts 39 and 40 (Fig. 9). The sleeve 30 which contains the micrometer abutment 29 is partially divided to provide a resilient clamp ring 41 (Fig. 1), the parts of which are controlled by a clamp bolt 42 so as to secure the adjustments of the abutment.

The present machine is designed to operate with its work spindle horizontal and the axis of the tool holder trunnions also horizontal and disposed at right angles to the spindle axis. It is designed also to permit easy removal and replacement of the tool holder. In order to support the weight of the holder when the bearing caps are displaced, the cleavage planes between the box and cap members of both bearings are located on an inclination such that the fixed part or box member of each bearing extends forwardly beyond the axis of the trunnions, providing a ledge adequate to support the weight of the holder and all of the parts connected with it. This ledge for the bearing 26 is shown at 43 in Fig. 8, and that of the bearing 27 at 44 in Fig. 9.

Mounting of the tool holder by means of alined trunnions, enables the axis of the tool to be placed either exactly parallel with the axis of the work, or at an inclination in either direction to the latter axis. Its adjustment in this manner is controlled by a screw 45, shown best in Figs. 3 and 11, which is adjustable in a line parallel with the work spindle axis and bears on an abutment pin 46 mounted in and between two separated lugs 47 and 48 which project from the side of the tool holder intermediate the trunnions. A pin 49, pressed upon by a spring 50, bears on the abutment pin 46 at the opposite side from the adjusting screw and holds it in contact with the screw. A gauge plate 51 of prescribed thickness is interposed between the head of the screw 45 and an adjacent shoulder 52 on the holder for the screw, to establish the position of the screw for locating the tool axis exactly parallel with the work spindle axis, thus avoiding necessity of measurements or tests on the part of the machine operator to insure absolute parallelism of the two axes. A set screw 53 is provided to clamp the adjusting screw 45 against accidental displacement. To facilitate removal of the tool holder, as previously mentioned, the adjusting screw 45 and spring reaction pin 49 are both mounted in a holder 54 which is pivoted by a pivot pin 55 between lugs 56 on a bracket secured to the top side of the machine frame. This permits the holder to be swung upward from the illustrated position, carrying the adjusting screw clear of the abutment pin 46. A stop 57, conveniently made as a pin set in the holder, is arranged to bear on the upper side of the abutment pin 46 when the adjusting screw and reaction pin are in the prescribed alinement with the abutment pin 46. When the holder is swung clear of the abutment pin, the reaction pin is restrained in its guideway by a nut 58 on the protruding end of a stem which is a part of the abutment pin and passes through a fixed bushing 59. Spring 50 surrounds this stem and reacts against the forward end of the bushing.

Angular adjustments given to the tool holder by means of the screw 45 enable the tool to be skewed with respect to the work piece at the pitch point sufficiently to correct errors due to distortion of the gear in heat treatment, or similar errors occurring from other causes in manufacture.

It has been stated previously that the tool carrier 19 is mounted revolubly in the holder 24. The means for supporting it in this fashion, and also centering it and maintaining it in a definite plane with respect to the holder, comprise three or more rolls 60 of double conical formation which are supported by the holder and enter an encircling V-shaped groove in the outer circumference of the carrier 19. The complemental inclinations of the side faces of these rolls and groove together with capacity for adjustment of one or more of the rolls, insure absence of backlash in the running of the carrier.

Two alternative arrangements of supporting rolls are shown in these drawings. In one of these arrangements, illustrated in Figs. 1, 2 and 3, there are three rolls, of which the one shown at the right hand side of Figs. 1 and 2 is radially adjustable in the axis of the trunnions, and the other two are non adjustably mounted at equal distances apart around the circumference of the tool carrier from the adjustable roll and from each other. The pivot 62 of the adjustable roll (Fig. 2) is mounted in the opposite bounding walls of a recess in the inner end of a plunger 63, which plunger is slidable endwise in the trunnion 26 (the latter being coaxially bored for the purpose), and is pressed upon by a spring 64. The spring reacts through a self centering washer 65 against a screw 66 which is threaded through a cap 67 secured across the outer end of bearing 26. This spring maintains a constant pressure between all of the rolls and the carrier, which pressure may be regulated by the screw 66. The pivots for the other rolls are contained in bearings mounted in any suitable way within chambers or recesses in the holder ring 24. Preferably ballbearings are provided with all of these rolls.

In the alternative arrangement shown in Figs. 11, 12 and 13, four equivalent rolls 60 are used supported equiangularly around the center of the corresponding holder 24a, and each is independently adjustable radially. Each of the rolls is journaled in a bracket 68, the ends of which, at respectively opposite sides of the roll, are secured in the hollow interior of the holder, outside of the circumference of the tool carrier, by a pivot stud 69 and a clamp bolt 70. The bolt passes through a slot in the adjacent end of the bracket, and thence into a tapped hole in the side of the holder. The slot is elongated in an arc concentric with the pivot stud 69, which permits such movement of the bracket, when the clamp bolt is loosened, as will shift the roll radially of the holder, and an abutment screw 71 is threaded radially through the outer circumference of the holder into engagement with the outer side of the bracket. All of the rolls are thus mounted and each may be adjusted independently of the others so as to locate the tool accurately with its axis intersecting the trunnion axis, and to compensate for wear. The arrangement just described is considered preferable to the three roll combination since it provides a more efficient support for the considerable weight of the rotating tool and its carrier and enables the tool axis to be maintained at exactly the height of the trunnion axis even though the different rolls and their pivots and bearings may wear unequally.

In other respects the carrier 24a and its supporting and adjusting means shown in Figs. 11 and 12 are substantially the same as the corresponding parts of the design first described, although differing in some minor details, wherefore they are designated by the same reference characters, modified by exponents. One difference which may be noted is that the adapter 18 is omitted, and the tool T' is shown as clamped directly to the rotating carrier 19a. A different work holding arbor 15a is also shown, adapted to support a specifically different work piece. A minor variation may also be noted in the spring pressed pin 49a reacting against the adjusting screw 45, in that the spring 50a is confined within the interior of this pin and reliance is placed wholly on the set screw 72, the end of which projects into a groove 73 in the side of the pin, to restrain this pin in its socket when the adjusting screw holder is lifted clear of the abutment pin 46a.

In both illustrations the rotating carrier is equipped with shields 74, 75 and 74a, 75a, respectively, to exclude the lapping composition, etc., from the outer circumference of the rotating holder; and the shields 74 and 75 are equipped with felt wipers 76 and 77, shown in Figs. 3 and 10.

The work spindle 17 is rotated in its alined bearings 78 and 79 by a shaft 80 in axial alinement with it, and to which it is coupled by an external clutch member 81 and a complemental internal clutch member 82 which are longitudinally ribbed for interlocking driving engagement while permitting relative reciprocation. Shaft 80 is driven from a main shaft 83 by a helical gear 84 (Fig. 6) on said shaft meshing with a helical gear 85 on a shaft 86, and by change gears 87 and 88 on shafts 86 and 80 respectively. The work spindle is reciprocated by a gear segment 89 meshing with encircling rack teeth 90 on the spindle and keyed to a transverse shaft 91; which shaft is oscillated by a crank 92 on its outer end, a connecting rod 93, and a crank pin 94 adjustably fixed in a diametral slot in a crank disk 95 on the end of a shaft 96. Shaft 96 in turn is driven from the main shaft 83 by conjugate helical gears 97 and 98, change gears 99 and 100, shaft 101, and helical gears 102 and 103, the latter gear being secured to shaft 96. Also mounted on the shaft 96 is a crown gear 104 in mesh with a pinion 105 on a shaft which runs to the front of the machine and there carries a hand wheel 106 by which the mechanism may be moved by hand when desired. By adjustment of the crank pin 94 the reciprocating travel of the work piece may be varied, while by appropriate substitutions of the change gear pairs 87, 88 and 99, 100, the ratio of rotations to reciprocations of the work may be controlled and regulated in desired degree within wide limits. It is possible thus to obtain a rapid reciprocation with slow rotation or vice versa.

The tool, when brought into mesh with the work piece, is rotated by the latter; and its resistance to rotation is one factor of means for exerting lapping pressure on the work. This resistance may be augmented by friction members in the nature of brake shoes, one of which is shown in section at 107 in Fig. 7 as bearing against the circumference of the tool carrier 19 and pressed against it by a spring 108, which may be regulated by a screw 109. Fig. 1 shows provisions for two such brake members.

The teeth of the internal gear lapping tool roll on the teeth of the work piece with an amount of radial slip which is small at the most, and can be reduced to the minimum by making the tool with the least excess of pitch diameter over the work which will produce intermeshing gear action. The gear action is essential because it brings the same teeth of the work into contact successively with different teeth of the tool, without necessity for interrupting the lapping action to index either the work or the tool, and finishes the gear teeth to uniform accuracy of shape, dimensions and spacing.

It was stated at the beginning of this specification that the new features of this invention are particularly useful for lapping straight spur gears. This is not to be construed as limiting its utility however, for the same machine may be used for lapping helical gears also by substitution of a tool having teeth with the same helical lead as those of the work piece.

It will be apparent that the machine may be used with exact reversal of the function previously described. That is, it may be used for lapping, burnishing, or similarly finishing internal gears by using an accurately formed spur gear, made of suitable material and mounted on the work spindle 17, while the internal gear to be finished is mounted in the annular carrier 19 in place of the tool previously described. The protection which I claim for the invention is intended to include all novel characteristics of the machine in either mode of use.

The annular tool holder with its supporting and adjusting means here shown has been designed as an attachment for the gear finishing machine shown in my Patent No. 1,990,239 granted February 5, 1935, permitting the same machine to be used interchangeably with either the three lapping tools of the prior disclosure or the single internal gear tool of the present disclosure. Hence some features of the prior machine which do not coact with the present new features have been incidentally shown in the drawings. But the description in this specification has been confined to those parts only which cooperate in the new combination. And it is to be understood that the essential characteristics of the present new invention may be embodied in combination with specifically different auxiliary mechanisms.

What I claim and desire to secure by Letters Patent is:

1. A gear finishing machine comprising a work spindle, a finishing tool in the form of an internal gear surrounding said work spindle with its axis parallel to the axis of the spindle and at such a distance therefrom as to effect intermeshing of its teeth with the teeth of a work gear mounted on the spindle, and provisions for inclining the tool angularly about an axis intersecting, and perpendicular to, the axis of both the tool and the work spindle so as to bring its meshing teeth into skewed relationship with the contacting teeth of the work piece.

2. A gear finishing machine comprising a rotatable and reciprocatable work spindle, a tool in the form of an internal gear conjugate to the gear to be finished, a holder for said tool having an open interior space in which the tool is rotatably mounted and having trunnions in alinement with a diameter of the tool mounted on the machine in a line intersecting the work spindle axis and in a position such that the tool surrounds such axis, the holder being tiltable about the trunnion axis between a position in which the plane of rotation of the tool is perpendicular to the work spindle axis and other positions in which such plane is inclined to the work spindle axis.

3. A gear finishing machine comprising a work spindle, an annular work holder, a finishing tool in the form of an internal gear mounted rotatably in said holder, the holder having trunnions in diametral alinement with said tool and the machine having bearings for said trunnions located to support the holder with the tool surrounding the work spindle axis and the trunnion axis intersecting the work spindle axis at right angles thereto, said trunnions being slidable endwise in their bearings, and an adjustable stop in line with one of the trunnions for locating the tool with its center at a given distance from the work spindle axis.

4. A gear finishing machine comprising a work spindle, an annular work holder, a finishing tool in the form of an internal gear mounted rotatably in said holder, the holder having trunnions in diametral alinement with said tool and the machine having bearings for said trunnions located to support the holder with the tool surrounding the work spindle axis and the trunnion axis intersecting the work spindle axis at right angles thereto, said trunnions being rotatable in their bearings, and means for turning the holder about the trunnion axis so as to set the tool at a desired skew angle to the work spindle.

5. A gear finishing machine comprising a work spindle, a tool holder having an open interior, a finishing tool in the form of an internal gear rotatably mounted in the interior of said holder, means for supporting said holder with the tool surrounding the axis of the work spindle and with provisions for shifting of the holder so as to alter the center distance between the tool and spindle.

6. A gear finishing machine comprising a work spindle, a tool in the form of an internal gear, an annular holder in which said tool is rotatably mounted, alined trunnions projecting from opposite sides of said holder, means in the holder for centering the tool on the axial line of said trunnions, bearings on the machine arranged to receive said trunnions and hold them with their axis intersecting the work spindle axis, said bearings being constructed to permit movement of the holder in the line of the trunnion axis and angular adjustment of the holder about said axis.

7. In a gear finishing machine, a tool holder assemblage comprising an annular holder having an open interior and oppositely projecting alined trunnions, a tool in the form of an internal gear, and means in the holder for supporting said tool rotatably and centering it with its axis intersecting and perpendicular to the axis of the trunnions.

8. A gear finishing machine comprising a holder having an open interior and oppositely projecting alined trunnions, a tool in the form of an internal gear, and means for supporting and centering said tool with its axis intersecting the trunnion axis, comprising three rolls, one of which is mounted with its axis adjacent to one of said trunnions and intersecting the axis thereof, and the other two are equally spaced around the tool axis, and means for adjusting the first of said rolls in the axial line of the adjacent trunnion.

9. In a gear finishing machine, a tool holder having an open interior and oppositely projecting alined trunnions, one of said trunnions having a hollow interior, a plunger fitted to slide in said trunnion, a bearing roll carried by said plunger, two other bearing rolls spaced approximately equidistant from the before named rolls on the circumference of a circle of which the center is in the axis of said trunnions, and a finishing tool in the form of an internal gear supported and centered by said rolls.

10. In a gear finishing machine, a holder having an open interior and external axially alined trunnions, a series of supporting rolls mounted in the interior of said holder spaced about and equidistant from a point between the trunnions and in the axis thereof, and an annular tool carrier located between and in engagement with said rolls.

11. A holder as set forth in claim 10, in which the tool carrier has an encircling circumferential groove with tapered sides and the rolls have complementally tapered sides and are disposed to project into said groove and make contact with the sides thereof.

12. A tool holding means as set forth in claim 10, combined with means for adjusting one of the rolls radially of said central point.

13. A tool holding means as set forth in claim 10, combined with independent adjusting means for each of said rolls operative to regulate their distance from said central point.

14. A gear finishing machine comprising a supporting structure, a horizontal work spindle mounted in said supporting structure, horizontal bearings at opposite sides of the work spindle axis in axial alinement with one another on a line intersecting the work spindle axis, a tool holder having trunnions at opposite sides fitted to said bearings and having also an open interior and a finishing tool in the form of an internal gear mounted rotatably within said carrier with its axis substantially parallel to the work spindle axis and intersecting the axial line of said trunnions and bearings; the bearings being constructed in two parts, one of which is fixed to the frame structure and the other is separable from the fixed part, and the cleavage plane between said parts being substantially diametral and inclined in such fashion that the fixed part provides a ledge extending beneath the trunnions and across the perpendicular from the axis thereof.

15. A gear finishing machine comprising a supporting structure, a rotatable and axially movable work spindle, a tool holder having an open interior and axially alined external trunnions, a tool revolubly mounted within said holder surrounding the work spindle axis and arranged with its axis of rotation substantially parallel to the before named axis, bearings on the frame structure for said trunnions alined on an axis intersecting both the work spindle and tool axes, in which the trunnions are rotatably and reciprocatably movable, a micrometer abutment on one of the bearings for engagement with the trunnion therein to arrest such reciprocative movement, and an adjusting pinion journaled in one of the bearings and meshing with rack teeth in the side of the trunnion therein.

16. A gear finishing machine comprising a driving shaft, a work spindle connected with said shaft to be rotated thereby and adapted to carry an external gear to be finished, a tool in the form of an internal gear conjugate to the work gear, and means for rotatably supporting said tool comprising a carrier in which the tool is secured and rolls engaging the carrier externally, distributed around the circumference of the carrier with a circumferential spacing in either direction between adjacent rolls less than the diameter of the carrier and located to position the tool in running mesh with the work gear.

17. A gear finishing machine comprising a driving shaft, a work spindle connected with said shaft to be driven thereby and having provision for axial movement relatively thereto, a finishing tool in the form of an internal gear conjugate to the work gear, supporting means for said tool holding the same rotatably in driven mesh with the work gear, and means for moving the spindle back and forth endwise simultaneously with the rotation of the shaft.

18. A gear finishing machine comprising means for supporting and rotating an external gear to be finished, a finishing tool in the form of an internal gear conjugate to the work gear, an annular carrier for said tool, and means for supporting the tool rotatably in mesh with the work gear, comprising rolls distributed around the carrier in external contact therewith and with a spacing between adjacent rolls in either direction circumferentially of the carrier less than the diameter of the carrier, one at least of said rolls being adjustable radially of the carrier, and means for adjusting said adjustable roll.

19. A gear finishing machine comprising a spindle adapted to support and rotate an external gear to be finished, a tool in the form of an internal gear conjugate to the work gear, a holder supporting said tool rotatably and having external trunnions alined with a diameter of the tool, bearings in which said trunnions are rotatably mounted, and means for locating the holder in a given plane wherein the axis of said trunnions is included, comprising an abutment on the holder at a point intermediate the trunnions, and stops engaging opposite sides of said abutment in an alinement substantially parallel with the axis of the tool.

20. A gear finishing machine comprising a spindle adapted to support and rotate an external gear to be finished, a tool in the form of an internal gear conjugate to the work gear, a holder supporting said tool rotatably and having external trunnions alined with a diameter of the tool, bearings in which said trunnions are rotatably mounted, and means for locating the holder in a given plane wherein the axis of said trunnions is included, comprising an abutment on the holder at a point intermediate the trunnions, and stops engaging opposite sides of said abutment in an alinement substantially parallel with the axis of the tool, one of said stops being a screw adjustable along the alinement specified, and the other being a pin movable in the same alinement and yieldingly pressed toward the abutment.

21. A gear finishing machine comprising a rotatable work spindle adapted to carry an external gear to be finished, an annular tool holder surrounding the axis of said spindle and having external trunnions alined transversely to said axis, a tool in the form of an internal gear conjugate to the gear to be finished, rotatably mounted in the holder in position to run in mesh with the work gear, bearings on the machine in which the trunnions are supported rotatably, an abutment on the holder at one side of the trunnion axis, stop elements engaging opposite sides of said abutment in an alinement substantially parallel to the work spindle axis, and a holder for said stop members movably mounted on the machine to shift the stop members into and out of engagement with the abutment, whereby to permit removal of the tool holder.

EDWARD W. MILLER.